(12) United States Patent
Guay

(10) Patent No.: US 12,387,266 B2
(45) Date of Patent: Aug. 12, 2025

(54) SYSTEM AND METHOD FOR PRIORITIZING TRANSMISSION OF TRADING DATA OVER A BANDWITDH-CONSTRAINED COMMUNICATION LINK

(71) Applicant: Banque Nationale du Canada, Montreal (CA)

(72) Inventor: David Shaun Guay, New York, NY (US)

(73) Assignee: Banque Nationale du Canada, Montreal (CA)

( * ) Notice: Subject to any disclaimer, the term of this patent is extended or adjusted under 35 U.S.C. 154(b) by 298 days.

(21) Appl. No.: 16/948,938

(22) Filed: Oct. 6, 2020

(65) Prior Publication Data

US 2021/0105215 A1 Apr. 8, 2021

Related U.S. Application Data

(60) Provisional application No. 62/912,136, filed on Oct. 8, 2019.

(51) Int. Cl.
*G06Q 40/06* (2012.01)
*G06F 16/2457* (2019.01)
(Continued)

(52) U.S. Cl.
CPC ....... *G06Q 40/06* (2013.01); *G06F 16/24578* (2019.01); *H04L 43/0882* (2013.01); *H04L 47/2475* (2013.01)

(58) Field of Classification Search
CPC ............................ G06Q 40/06; H04L 47/2475
See application file for complete search history.

(56) References Cited

U.S. PATENT DOCUMENTS

| 5,278,687 A | 1/1994 | Jannson et al. |
| 5,842,010 A | 11/1998 | Jain et al. |

(Continued)

FOREIGN PATENT DOCUMENTS

| CA | 2707196 A1 | 1/2011 |
| CA | 2706252 A1 | 3/2011 |

(Continued)

*Primary Examiner* — Christine M Behncke
*Assistant Examiner* — Chinedu U. Ekechukwu
(74) *Attorney, Agent, or Firm* — Erise IP, P.A.

(57) ABSTRACT

A method, a processing device and a computer-readable medium are provided for prioritizing trading data transmission over bandwidth-constrained communication link. The method comprises comparing fields of records indicative of the current states of securities of interest with corresponding fields of one or more previous records for said securities. The records are associated with securities being traded or to securities whose prices are being used for trading. The method comprises calculating variations of the fields and assigning priorities to the different securities of interest, based on the calculated variations, and sending fields characterizing the current state of the securities having the highest priorities over the bandwidth-constrained communication link, up to bandwidth capacity, to a remote computing device. The remote device can thereby receive in priority trading data associated with securities having the most significant or impactful variations.

18 Claims, 7 Drawing Sheets

(51) Int. Cl.
*H04L 43/0882* (2022.01)
*H04L 47/2475* (2022.01)

(56) References Cited

U.S. PATENT DOCUMENTS

| | | | |
|---|---|---|---|
| 6,005,581 A | 12/1999 | Craddock et al. | |
| 7,555,456 B2 | 6/2009 | Rosenthal et al. | |
| 7,912,781 B2 | 3/2011 | Rosenthal | |
| 8,429,059 B2 | 4/2013 | Rosenthal | |
| 9,578,540 B1 | 2/2017 | Adams | |
| 9,619,410 B1 | 4/2017 | Brandenberger | |
| 9,674,118 B2 | 6/2017 | Walker et al. | |
| 9,846,910 B2 | 12/2017 | Marynowski et al. | |
| 9,882,781 B2 | 1/2018 | Pope | |
| 9,990,393 B2 | 6/2018 | Parsons et al. | |
| 10,057,333 B2 | 8/2018 | Pitio et al. | |
| 10,101,808 B2 | 10/2018 | Buck | |
| 10,305,786 B2 | 5/2019 | Aked | |
| 10,310,534 B2 | 6/2019 | Forbes, Jr. | |
| 10,311,515 B2 | 6/2019 | Katsuyama et al. | |
| 2006/0069635 A1* | 3/2006 | Ram | G06Q 30/08 705/37 |
| 2006/0167784 A1* | 7/2006 | Hoffberg | G06Q 40/04 705/37 |
| 2007/0087756 A1* | 4/2007 | Hoffberg | G06Q 10/06375 455/450 |
| 2008/0002677 A1* | 1/2008 | Bugenhagen | H04L 43/0894 370/356 |
| 2010/0287294 A1 | 11/2010 | Battyani et al. | |
| 2013/0159449 A1 | 6/2013 | Taylor et al. | |
| 2015/0073967 A1 | 3/2015 | Katsuyama et al. | |
| 2016/0219024 A1* | 7/2016 | Verzun | H04L 9/34 |
| 2017/0331774 A1 | 11/2017 | Peck-Walden et al. | |
| 2018/0183901 A1* | 6/2018 | Lariviere | H04L 69/08 |
| 2019/0020466 A1 | 1/2019 | Raymond | |
| 2019/0155933 A1 | 5/2019 | Walker | |
| 2020/0211108 A1* | 7/2020 | Pierce | G06Q 40/04 |

FOREIGN PATENT DOCUMENTS

| | | |
|---|---|---|
| CA | 2913700 A1 | 11/2015 |
| CA | 2922072 A1 | 2/2016 |
| CA | 2927532 A1 | 4/2016 |
| CA | 3000464 A1 | 4/2017 |

* cited by examiner

SYSTEM AND METHOD FOR PRIORITIZING TRANSMISSION OF TRADING DATA OVER A BANDWITDH-CONSTRAINED COMMUNICATION LINK

This application claims the benefit of and priority to U.S. Provisional Patent Application No. 62/912,136 filed Oct. 8, 2019 and entitled "SYSTEM AND METHOD FOR PRIORITIZING TRANSMISSION OF TRADING DATA OVER A BANDWIDTH CONSTRAINED COMMUNICATION LINK", the entire contents of which is hereby incorporated by reference herein.

TECHNICAL FIELD

The technical field generally relates to the prioritization of data over transmission links, and more particularly relates to systems and method of prioritization of trading data for transmission over bandwidth-constrained communication links.

BACKGROUND

It is common for financial institutions, brokers and trading entities to engage in market making activities and/or trading of stocks and commodities. For example, a financial institution may engage in market making activities on multiple exchanges (such as the TSX, NYSE, Chicago CME, etc.) that require carrying out pre-determined strategies using rules or algorithms operating on multiple servers, feeding off from multiple sources of financial data (or trading data). Market making and trading activities result in millions of trades occurring on a microsecond scale. The speed at which the different entities receive updated information, including price and volume information of other parties' trades from the different exchanges is key to the successful execution of their market making and/or trading strategies.

Financial institutions and trading entities typically have their own system (servers and telecommunication equipment) within the exchange buildings, to receive the trading information with the smallest possible delay. When it is not possible to locate their equipment within the exchange building, trading systems are located in buildings that are physically close to the exchanges and/or receive the trading data from vendors or aggregators that can transmit the data rapidly. In order to transmit trading data of interest between the different servers of a trading entity, which are typically located remotely from one another, such as in different cities or countries, different types of communication links can be used. The communication links (such as optical fibers and/or radio waves) come at different prices for different bandwidths. Direct communication links typically come at higher prices, since they typically result in faster communication. However, given their high prices, the bandwidth of such links is limited, and thus the bandwidth of these communications links must be optimized to avoid wasting it.

Based on the foregoing, there is a need to optimize utilization of bandwidth-constrained links for trading data transmission.

SUMMARY

According to an aspect, a computer implemented method for prioritizing transmission of trading data over a bandwidth-constrained communication link between first and second processing devices is provided. The trading data is received at the first device and sent toward the second device, remote from the first device. The method comprises the steps of:

receiving at least one trading data feed at the first device, from one or more sources of trading data, each trading data feed comprising a plurality of records, the records being associated with securities being traded, each record comprising fields that are indicative of a current state of a given security;

comparing the fields of record relating to securities of interest with corresponding fields of one or more previous records for said securities and calculating variations of said fields; and sending fields characterizing the current state of the securities having the highest priorities over the bandwidth-constrained communication link, up to bandwidth capacity, to said second computing device, the priorities being assigned based on the calculated variations.

The method thereby allows the second device to receive in priority trading data associated with securities having the most significant variations.

According to possible implementations, the trading data feeds(s) comprise(s) L1 (Level 1) or top of book trading data feed and/or L2 (Level 2) trading data feed.

According to possible implementations, the method may comprise a step of normalizing the trading data feed, when the records received in the one or more data feeds are structured according to different formats.

According to possible implementations, the one or more trading data feeds received at the first device comprises one or more full depth (L3) trading data feeds. In his case, the method further comprises a step of creating a book of orders from the one or more full depth trading data feeds received.

According to possible implementations, the fields of the records received at the first device may include: top of book bid price, top of book ask price, top of book bid volume and top of book ask volume. It is also possible for the fields of the records to further comprise: the last traded price, the last traded volume and/or daily turnover volume. The fields may also include ticker/security symbol or security identifier, quote time, exchange identity, an indication of a completed trade, notifications of corrections and/or admin messages.

According to possible implementations, the one or more sources of market data include exchanges, market data vendors, aggregators, brokers and/or dealers.

According to possible implementations, the step of calculating the variations comprises at least one of: calculating a bid price decrease or increase; calculating an ask price decrease or increase; calculating a bid volume decrease or increase; calculating an ask volume decrease or increase; calculating a last traded price decrease or increase; and calculating a last traded volume decrease or increase.

According to possible implementations, the method comprises a step of identifying, from the at least one trading feed, records relating to securities of interest by verifying an identifier field of a given record and matching it to an identifier in a list of predetermined identifiers.

According to possible implementations, the step of assigning priorities to the securities of interest is also based on a list in which the securities of interest are ordered from the security having the most level of interest to the security having the least level of interest.

According to possible implementations, the step of assigning priorities to securities of interest is performed using a 2-dimensional matrix, said 2-dimensional matrix comprising a first dimension corresponding to an amplitude of the calculated variations and a second dimension corresponding to a type of variations, the type of variations including a price variation or a volume variation.

According to other possible implementations, the step of assigning priorities to securities of interest is performed using a 3-dimensional matrix, said 3-dimensional matrix comprising a first dimension corresponding to an amplitude of the calculated variations; a second dimension corresponding to a type of variations, the type of variations including a price variation or a volume variation; and a third dimension corresponding to the level of interest of the securities. It is also possible to assign priorities to securities of interest using a plurality of different matrices.

According to possible implementations, rules are set to assign a higher priority to securities having price variations over volume variations. Preferably, the rules for attributing the priorities to the different securities of interest are configurable and/or adaptable.

According to possible implementations, the method may comprise a step of continuously determining the remaining available bandwidth of the bandwidth-constrained communication link, and adjusting the number of current state records to be sent over the first communication link based on the remaining available bandwidth determined.

According to possible implementations, a second bandwidth-constrained link is provided between the first and the second device, wherein the second bandwidth-constrained link is less constrained that the first communication link. The method further comprises a step of sending the current state fields relating to securities having been assigned a priority to the second constrained-bandwidth link, when the first bandwidth-constrained communication link is full.

According to possible implementations, an unconstrained bandwidth link may also be provided between the first and the second device. The method further comprises a step of sending all current state fields of the securities of interest on said unconstrained communication link.

According to possible implementations, the first bandwidth-constrained communication link can be a radio-frequency link, and the second communication link can be a fiber optic communication link.

According to another aspect, another possible computer implemented method is provided, for prioritizing transmission of trading data over a bandwidth-constrained communication link between first and second devices. Financial data is received at the first device and sent toward the second device, remote from the first device. The method comprises the steps of:
  receiving at least one financial data feed at the first device, from one or more sources of financial data, each financial data feed comprising a plurality of records, the records being associated with financial instruments, each record comprising fields that are indicative of a current state of a given financial instrument;
  assigning priorities to the different financial instruments;
  sending fields characterizing the current state of the financial instruments having the highest priorities over the bandwidth-constrained communication link, up to bandwidth capacity, to said second computing device.

According to a third aspect, a processing device for prioritizing transmission of trading data over a bandwidth-constrained communication link toward a second device is provided. The computing device comprises:
  an input port for receiving at least one trading data feed from one or more sources of trading data, each trading data feed comprising a plurality of records, the records being associated with securities being traded, each record comprising fields indicative of a current state of a given security;
  one or more processing means;
  a storage medium for continuously updating fields indicative of the current and previous states of the respective securities;
  additional storage medium for storing a prioritization logic module comprising instructions for:
    comparing the fields of records indicative of the current state of securities of interest with corresponding fields of records indictive of their previous state and calculating variations of said fields;
    assigning priorities to the different securities of interest, based on the variations calculated;
  an output port for sending fields characterizing the current state of securities having the highest priorities over the first bandwidth-constrained communication link, up to bandwidth capacity, to said second computing device.

According to possible implementations, the storage medium stores a 2-dimensional matrix which is continuously updated, said 2-dimensional matrix comprising a first dimension corresponding to an amplitude of the calculated variations and a second dimension corresponding to a type of variations, the type of variations including a price variation or a volume variation, rules being set for assigning higher priorities to securities having price variations with an amplitude above a given threshold.

In some implementations, the computing device can comprise a server or a cluster of servers. The computing device may also comprise an FPGA or an ASIC module.

According to possible implementations, the additional storage medium comprises a budgeter module, for continuously determining the remaining available bandwidth of the bandwidth-constrained communication link, and for adjusting the number of current state records sent over the first communication link based on the remaining available bandwidth determined. The input and output ports may be logical ports and/or physical ports.

In some implementation, the prioritization logic module comprises instructions for calculating variations, said variations comprising at least one of: a bid price decrease or increase; an ask price decrease or increase; a bid volume decrease or increase; an ask volume decrease or increase; a last traded price decrease or increase; a last traded volume and a daily turnover volume decrease or increase. In yet other implementations, the prioritization logic module may comprise instructions for assigning priorities to the securities of interest based on a list wherein the securities of interest are ordered from the security having the most level of interest to the security having the least level of interest.

The prioritization logic module is preferably configurable and/or adaptable so as to change the rules according to which the priorities are set. Changing the rules may comprise changing at least one of: an order of importance or level of interest in a given security relative to other securities, an order of importance or level of interest in a given type of variations; a threshold of a price variation for one or all securities of interest; a threshold of volume variation for one or all securities of interest; a threshold of last traded price variation for one or all securities of interest; and a threshold of last traded volume variation for one or all securities of interest.

According to another aspect, a computer-readable medium is provided. The computer-readable medium stores the prioritization logic module, which comprises instructions executable by a processor for:

comparing fields of records indicative of the current states of securities of interest with corresponding fields of one or more previous records for said securities, said fields being contained in records received on at least one trading data feed, transmitted by one or more sources of trading data, each trading data feed comprising a plurality of records, the records being associated with securities being traded; and calculating variations of said fields and assigning priorities to the different securities of interest, based on the calculated variations of said securities, for sending fields characterizing the current state of the securities having the highest priorities over a bandwidth-constrained communication link, up to bandwidth capacity, to a remote computing device, thereby allowing the remote device to receive in priority trading data associated with securities having the most significant variations.

According to another aspect, a method is provided to continuously update a top of book dataset, the method comprising:

maintaining a top of book dataset at a processing device;

continuously receiving trading data records from a bandwidth-constrained communication link and from an unconstrained link, each record comprising fields that are indicative of a current state of a given security, and including a quote time (or time tag);

updating the top of book dataset with the trading data having the most current quote time, regardless of the actual time at which the records have been received by the processing device.

DETAILED DESCRIPTION

Figure 1:
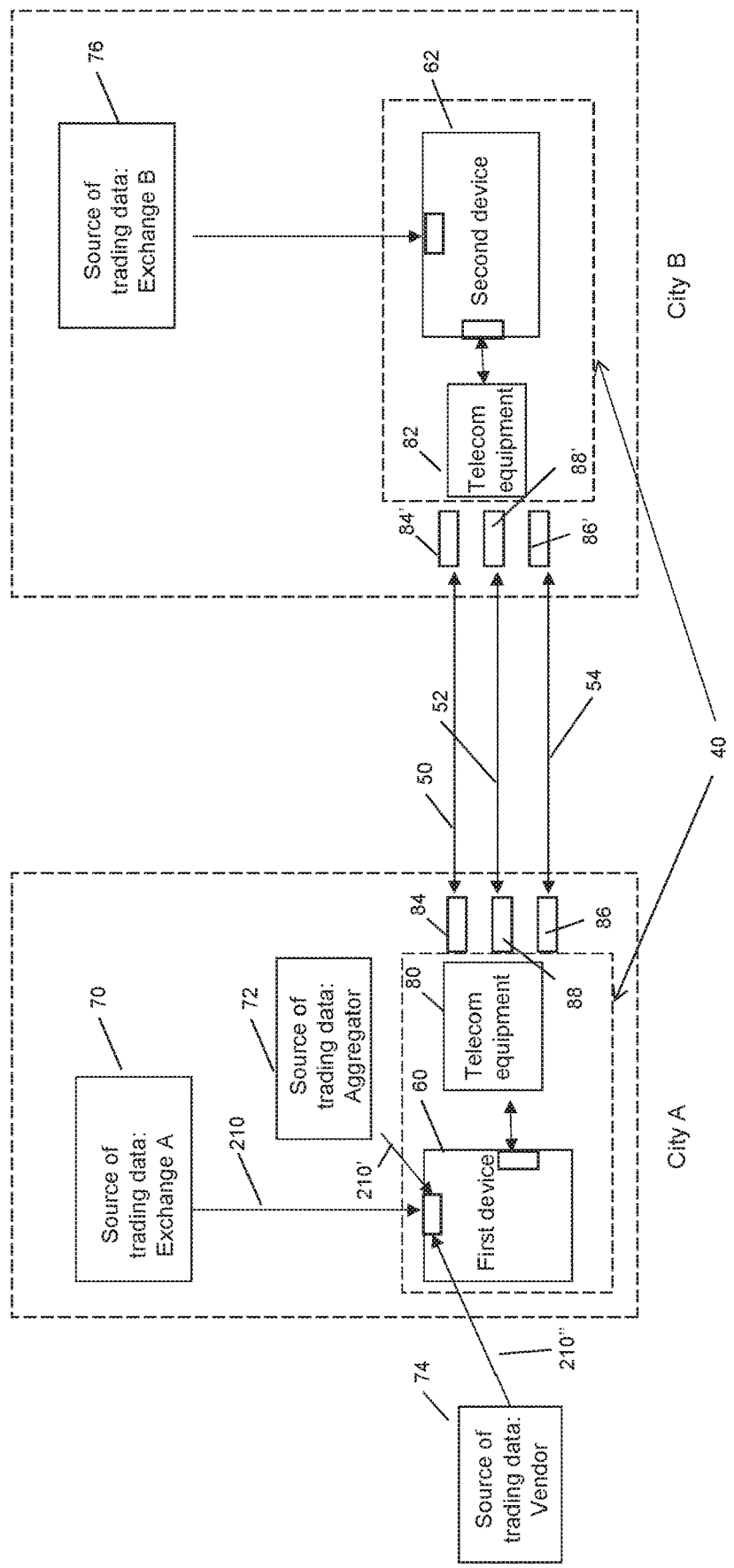
FIG. 1 is a schematic diagram of a system showing first and second trading devices, remotely located from one another, communicating via at least one bandwidth-constrained communication link, according to a possible embodiment of the invention.

In the following description, similar features in the drawings have been given similar reference numerals and, to not unduly encumber the figures, some elements may not be indicated on some figures if they were already identified in a preceding figure. It should be understood herein that the elements of the drawings are not necessarily depicted to scale, since emphasis is placed upon clearly illustrating the elements and interactions between elements.

In the present description, the term "security" refers to a financial instrument or an aggregate of financial instruments having a monetary value. Securities may include, but are not limited to: cash and/or derivative instruments, stocks, commodities, bonds, futures, options, exchange traded funds, contracts, debt-based instruments, equity-based instruments, financial indices, including for example indices that provide a measurement of sections of a stock market, etc.

The term "trading data" refers to data relating to, defining or characterizing securities. "Trading data" can comprise values corresponding to the previous state or the current state of a security, including for example previous or current "top of the book" bid price, bid volume, ask price and ask volume. "Trading data" can also comprise information on completed transactions, date and time of transactions, exchange identifiers, security identifiers such as ticker symbols, correction notices and/or administrative messages. Trading data may also be referred to as "market data" or "financial data". Depending on the source of trading data, the data format may differ. An "order" corresponds to an offer to buy (Bid) or sell (Ask) a security. Orders flow into the exchange and are inserted into a sorted "book" of orders, triggering the publication of one or more events on the financial data feeds. The highest bid and the lowest ask are referred to as the top of the book or the best book order.

A "record" is to be understood as an object or a data structure that "holds" or "contains" a group of values relating to a given security or financial instrument. Records contain different fields, such as a security codes, bid or ask prices, bid or ask volumes, dates, market period, etc., as examples only. Fields of records are typically only stored temporarily, as they are continuously updated, and can be transmitted or saved in database tables, arrays, files (such as ASCII, ASC, .TXT, .CSV, .XLS, etc.) and can transit in memory, such as registers, cache, RAM or flash memory, as examples only. The different fields can include numeral, date or character values.

A "trading data feed" corresponds to a flow of trading data incoming or outgoing from a processing device. Trading data feed can be generated by different sources of trading data, including for example by the processing devices of the different exchanges, financial institutions, but also trading data vendors, aggregators or normalizers, including for example Bloomberg, Interactive Data Corporation, Cbonds, iQFeed, eSignals, and the like. Trading data feed can include L1, L2 or L3 data feeds, as in commonly known in the field, where an L3 feed comprises the full depth of the book, i.e. the orders for all securities; an L2 feed comprises the top of book (BBO) and also the 5 to 15 closest price levels, each level including the orders for the same bid price or ask price, and the corresponding aggregate volume per price level. An L1 feed comprises only the highest bid and lowest ask prices and corresponding number or volume. The volume can correspond to the number of shares, contracts or units available for sale at the ask price or for purchase at the bid price.

The term "processing device" encompasses computers, servers, NIC (network interface controllers), switches and/or specialized electronic devices which are involved in the trading process, and which receive, process and/or transmit trading data. "Processing devices" are generally part of "trading systems" and include processing means, such as microcontrollers and/or microprocessors, CPUs or are implemented on FPGAs, as examples only. The processing means are used in combination with storage medium, also referred to as "memory" or "storage means". Storage medium can store instructions, algorithms, rules and/or trading data to be processed. Storage medium encompasses volatile or non-volatile/persistent memory, such as registers, cache, RAM, flash memory, ROM, as examples only. The type of memory is of course chosen according to the desired use, whether it should retain instructions, or temporarily store, retain or update data.

The term "communication link" (or "telecommunication link"), refers to communication channels connecting two or more processing devices. Communication links may encompass physical layers and/or logical layers, and the associated telecommunication equipment(s), involved or required in transmitting or receiving data between processing devices or nodes. A communication link encompasses wire, cable, radio, optical or other electromagnetic links. The physical transmission medium can include optical fibers, planar transmission lines and waveguides, coaxial cables, air, vacuum, and other media or structures through which electromagnetic waves (radio waves, microwaves, infrared radiation, visible light, etc.) can travel. Communication links can be characterized as a function of their bandwidth, i.e. the maximum throughput of the link—typically in bits/second; as function of their actual throughput, which is the actual rate of data being transferred, and which is typically less than the bandwidth; as function of the latency or time delay for the signal to travel from the sender to the receiver (depends of the propagation speed, and processing time at nodes traversed by the signal); as function of jitter (signal irregularities); and as a function of transmission errors and signal losses. Some communication links may be more bandwidth-constrained than others, and while the signal propagation speed may be high (or the latency low), the bandwidth or maximum throughput can be limited, for lack of availability or for cost reasons.

In the present description, and unless stated otherwise stated, the terms "connected", "coupled" and variants and derivatives thereof refer to any connection or coupling, either direct or indirect, between two or more elements. The connection or coupling between the elements may be mechanical, physical, operational, electrical or a combination thereof.

Referring to FIG. 1, according to a possible embodiment, a computer system 40 of a trading entity, for example a financial institution, is engaged in market making activities and receives on a first device 60 one or more trading data feed(s) 210, 210', 210", either directly from at least one exchange 70 or from financial data vendors 74 or aggregators 72. The trading data must be transmitted to other processing devices, such as second device 62, which needs the most current trading data to compute the current price of another security, as an example only. The trading computing systems 40 of the trading entity typically comprises several servers and/or databases spread out geographically. Thus, the trading system 40 includes several processing devices, such as first and second devices 60, 62, located in different cities and/or different countries, close to exchanges on which securities of interest are traded. It will be noted that the second processing device 62 may be connected to another exchange, as illustrated in FIG. 1, but not necessarily.

The trading data feed(s) received at the first processing device 60 may be unprocessed (raw) or processed trading data feed(s). In either case, the trading data feeds are typically received as a continuous stream of data, wherein the data is structured as "records", i.e. as sets of data relating to securities being traded. A "record" typically concerns a single security. In this exemplary embodiment, the first processing device is connected, either directly or indirectly, to a telecommunication equipment 80, including for example routers, high speed switches, nodes and the like, which in turn can be connected to optical fibers and/or radio antennas via communication ports, the different ports being indicated by reference numbers 84, 86 and 88 in FIG. 1. It should be noted that while only one telecommunication equipment is illustrated, there can be more than one device performing the routing/transmission functions, or they could also be integrated within the processing device 60. The trading data of interest, i.e. the trading data that is needed or relevant to perform/realize the entity's trading strategy, must be sent to a second device 62, which for example is responsible for consolidating the trading data received from different cities/exchanges and for executing the trading strategy, including for example placing orders.

Still referring to FIG. 1, the second device 62 is physically remotely located from the first device. For example, the first processing device can be located in city A, and the second processing device 62 can be located in city B. The first and second processing devices are thus connected or in communication via one or more communication links 50, 52, 54. At least one high-throughput, unconstrained-bandwidth communication link, identified as link 54, connects the first and second processing devices 60, 62. In this exemplary embodiment, two other communication links 50, 52 are provided between processing devices 60, 62. These links 50, 52 are bandwidth-constrained communication links. Indeed, communication links between two locations may be more or less direct, resulting in transmitting the trading data with more or less delay or latency. Low-delay links generally come at higher prices, and thus they can be referred to as "bandwidth-constrained" communication links. In this exemplary embodiment, link 50 represents a bandwidth-constrained communication link, and link 52 represents a second bandwidth-constrained link, being less constrained that the first bandwidth-constrained communication link 50. The bandwidth-constrained communication links 50, 52 can be direct optical fiber links or radio-frequency links, as examples only. Trading data sent over links 50, 52 is thus generally received faster at the second processing device 62, compared to when trading data is sent over link 54.

Given that the bandwidth of link 54 is unconstrained, all of the trading data received at the first processing device 60 can be sent thereon. However, for trading data transmission over bandwidth-constrained communication links, such as links 50 and 52, the proposed system and methods described hereinbelow consists in sending only trading data of most interest on said link(s). While it is known to filter trading data based on the security name or ticker symbol, the proposed method improves on existing methods and systems by prioritizing the trading data sent over the bandwidth-constrained communication link, based on the values or fields contained in said trading data. Instead of simply filtering the trading data to identify records relating to securities being tracked, and send this filtered trading data over a faster, high-cost communication link, regardless of whether there has been some relevant variations or activity for said securities, the present method and system proposes to analyse the trading data at the first processing device so as to identify unusual or large variations in prices or volumes, and send those records on the bandwidth-constrained link only when they are worth communicating. All of the trading data can still be sent entirely on the unconstrained-bandwidth link, but the proposed method and system allows for the second device to receive in priority the trading data associated with securities having the most significant variations, and which should be communicated in priority to the second processing device, as this information is key for executing trading entity's strategy, which can be used by a financial institution to fulfill market making duties, for example. In contrast with existing filtering methods, wherein trading data with no or very little changes is sent nonetheless, simply because it is tagged as a security being tracked, the present method and system allows to truly optimize use of bandwidth-constrained communication link by sending thereon trading data which includes information most relevant for timely executing the trading strategy.

Figure 2:
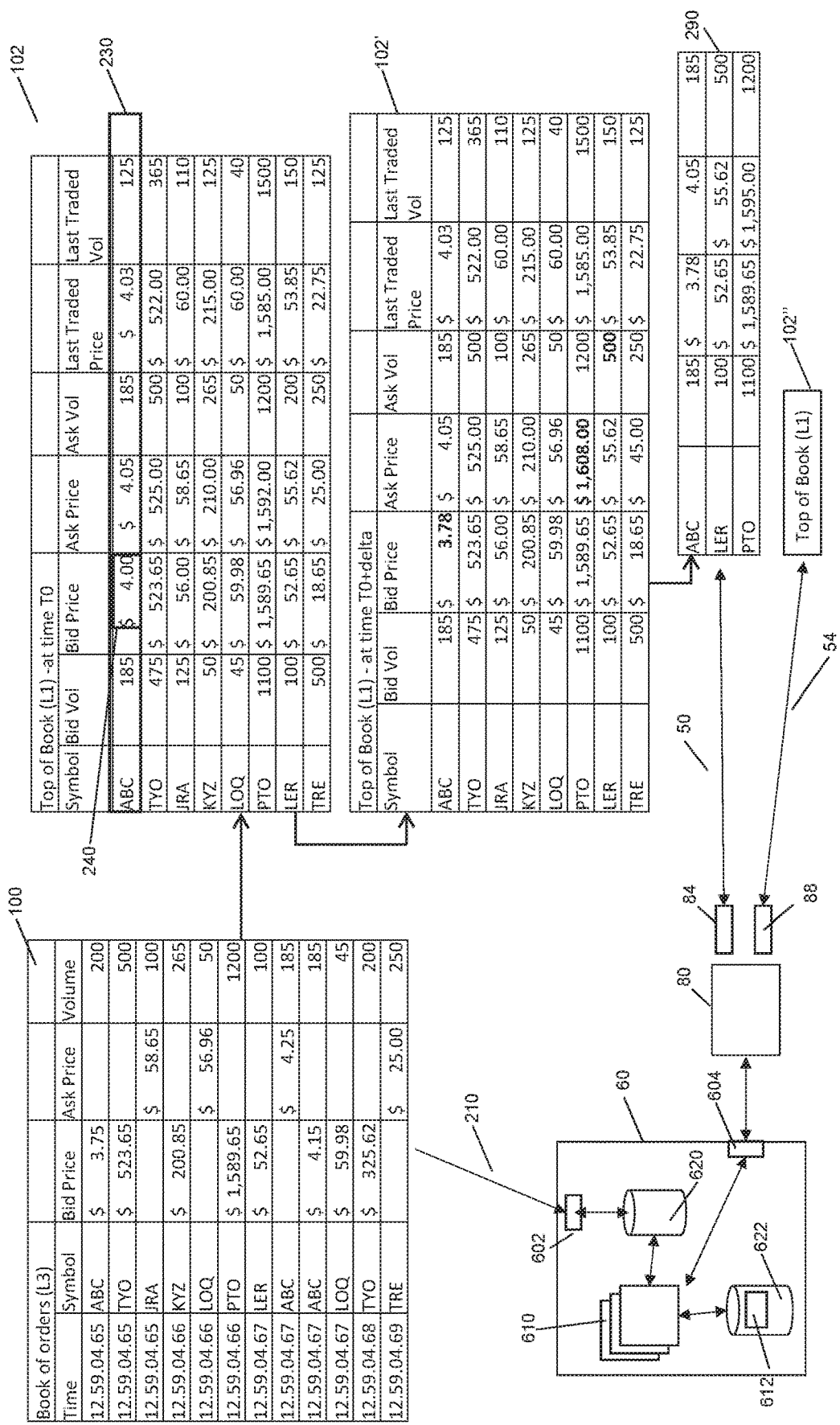
FIG. 2 is schematic diagram of the first device, with representations of trading data received, processed and transmitted by the first device, according to a possible embodiment of the invention.

The proposed method and system will be explained in more detail with reference to FIGS. 2 to 6. In FIG. 2, the first processing device 60 is illustrated, and comprises an input port 602, processing means 610, storage means 620, 622, including prioritization logic module 612 and an output port 604. Of course, the number and type of ports, processors/microcontrollers and memory storage may differ depending on the type of processing device, without departing from the present invention. In this exemplary embodiment, a trading data feed 210 is received on input port 602, wherein the term "port" encompasses a physical and/or logical port, depending on whether the processing device is embodied as an electronic chip, as a server or as another type of device. In this example, an L3 trading data feed 100 is received, i.e. the full book of orders. In cases where the trading data feed comprises records structured according to different formats, the processing device 60 normalizes the trading data to standardize the records in a single format. Once normalized, a top of book table or dataset is created and continuously updated, as illustrated by reference 102 and 102', where table 102 represents the top of book/L1 feed at time T0, and table 102' represents the top of book/L1 feed at time T1=T0+delta.

As mentioned previously, given that millions of trading orders are processed daily at exchanges, the top of book is continuously updated. In cases where the trading data feed already includes L1 (top of book)_trading data only, the step of creating/updating the top of book is not required. In the example illustrated in FIG. 2, a record is indicated by reference 230, and contains several fields 240, such as a security identifier (in this case the ticker symbol), the bid volume, bid price, ask price, ask volume, last traded price and last traded volume. Records can contain more, less or different fields, depending on the trading data received and the security of interest. As shown in the updated top of book 102', between time T0 and T0-delta, the bid price for security ABC has dropped from $4.00 to $3.78, the ask price for security PTO has raised from $1592.00 to $1608.00 and the ask volume for LER has increased from 200 to 500 shares. It will be appreciated that the "delta" period between time T0 and T1 is in the order of milliseconds or less, and that while in this example only three values have been updated, more fields are likely to change, even over very short update periods. Also, a limited number of securities are listed in the tables of FIG. 2, but typically, hundreds or thousands of security records are continuously received, updated and processed. Once processed, as will be explained in more detail with reference to FIGS. 3 and 4, some of the records will have been identified has having higher priority over other records, and the fields characterizing the current state of those securities having the highest priorities (represented by dataset 290 in FIG. 2) will be sent over the bandwidth-constrained communication link 50, up to bandwidth capacity, toward the second computing device. In this example, the "state" of a security is defined by its the bid price, bid volume, ask price and ask volume, but in other applications of the invention, the state of a security can be defined by other fields, including for example whether a transaction was completed or not, the price and size at which the last completed transaction occurred, as well as the total turnover volume.

Figure 3:
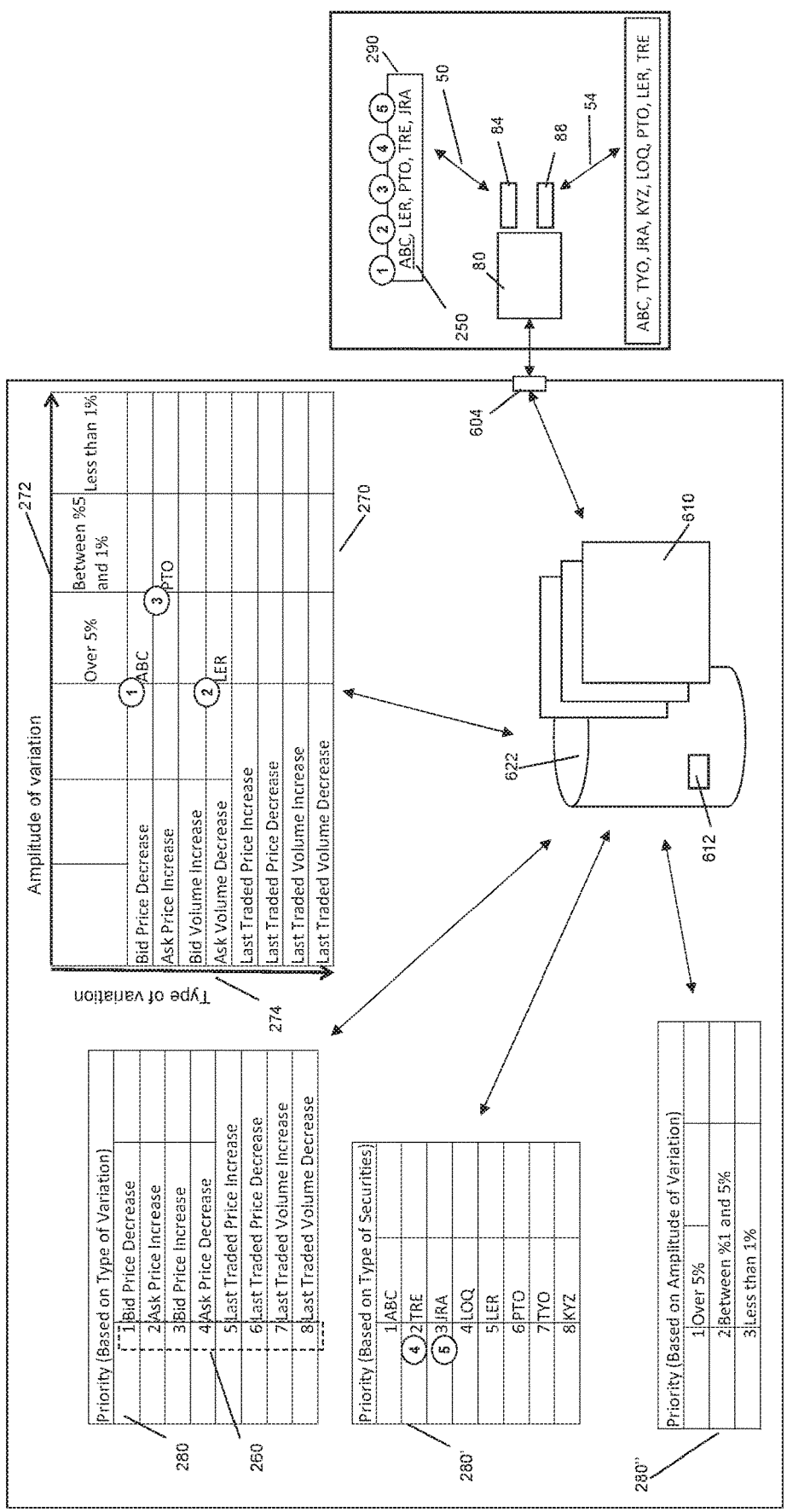
FIG. 3 is a schematic diagram showing tables for determining priority of trading data and showing a two-dimensional matrix for determining which security information is to be sent first on the bandwidth-constrained communication link, according to a possible embodiment.

Now referring to FIG. 3, different tables are illustrated to schematically represent the proposed method. While tables are depicted in FIG. 3, it will be understood that other data structures can be used instead, such as registries and buffers, as examples only. Tables 280, 280' and 280" illustrate different rules for setting up the priorities of the records received in the trading data feed by the prioritization logics module 612. Priorities can be set based on the type of variations of the fields, based on the security itself, and can be further based on the amplitude or magnitude of the variations calculated. While the amplitude variations are expressed as fixed intervals or "buckets" in table 280", they can also be expressed as continuous variations. Different thresholds can be set for determining whether the amplitude of a variation justifies sending the fields which are indicative of the state of the security presenting said variation over the bandwidth-constrained communication link. The variations can be expressed as relative percentage values or using absolute values, depending of the fields of the records being analyzed. Those rules can be set for a given use case or market environment but are configurable and adaptable. For example, the rules can be changed or adapted depending on whether the market is more or less volatile. In this example, as set forth in table 280, a "bid price decrease" is of more importance than a "ask price increase", but the priority or order of variation can be changed/adapted such that at another time or market period, the prioritization module can be configured such that an "ask price increase" will be set with a higher priority than a "bid price decrease". Similarly, for a given trading strategy or for a given trading period, securities can be prioritized as set forth in table 280', but the priority can be changed such that, for example, security LOQ be set with a higher priority than securities ABC, TRE or JRA. Finally, as set forth in table 280", large variations may be given a higher priority, even when the type of variation is not set with the highest priority. For example, the rules may be configured such that fields defining the current state of securities having price variations be sent in priority, except when very large variations occur on volumes, indicating a possible disruptive change that the second processing device should be aware of as early as possible.

In order to determine whether the updated field of a given security is worth sending over the bandwidth-constrained communication link, variations of said fields are continuously calculated, and compared with previous values for said fields. Calculating variations can comprises at least one of: calculating a bid price decrease or increase; calculating an ask price decrease or increase; calculating a bid volume decrease or increase; calculating an ask volume decrease or increase; calculating a last traded price decrease or increase; and calculating a last traded volume decrease or increase.

A two-dimensional matrix, schematically illustrated in table 272, can be used to assign priorities to the securities. The matrix comprises a first dimension corresponding to an amplitude of the calculated variations and a second dimension corresponding to a type of variations, the type of variations including for example price variations and/or volume variations, which may be positive or negative variations on the bid. Based on the different rules set forth for the type of variation, the type of security and the amplitude of the variations, securities will be assigned different priorities. It is also possible to set priorities based on other factors, such as completed transactions, date/time of transactions, etc. Fields relating to said securities, which characterizes their current state, are sent over the bandwidth-constrained link 50. It will be noted that while on the right side of FIG. 3, the dataset 290 only lists security identifiers, in practice all fields defining the current state of the securities may be sent over link 50.

A three-dimensional matrix can also be used to assign priorities to securities. The matrix could for example comprise a third dimension corresponding to the level of interest in predetermined securities, as indicated in table 280'. In this case, if securities ABC and KYZ have both been subjected to bid price decreases of a similar amplitude, the fields/trading information of security ABC will be sent over link 50 in priority over KYZ, since in table 280', security ABC is assigned a higher priority than security KYZ. The fields/trading information of security KYZ may only be sent if there remains available bandwidth on link 50 and will otherwise be sent over a less bandwidth-constrained link, such as link 52 or over the unconstrained bandwidth link 54. This process allows that fields related to security ABC be sent in priority over security KYZ, such that the second/remote processing device will receive the state information of security ABC before the state relating to security KYZ, in line with a trading strategy according to which it has been decided that security ABC was of more importance over KYZ.

Additional factors/dimensions can be used to determine the priority to assign to a given security and multidimensional matrices of priorities can be used as well. For example, it is possible to set the priorities using a plurality of matrices, in order to segment the securities into different "tiers" or "categories", to avoid not having any trading data sent on the bandwidth-constrained link. The rules for determining the priorities can be set such that securities can be sorted in a given category, but without superseding a higher priority category. For example, the rules can be set such that a large variation in an irrelevant stock is still considered of less priority than a small variation for a security listed on a given financial index, such as the SP500.

Figure 4:
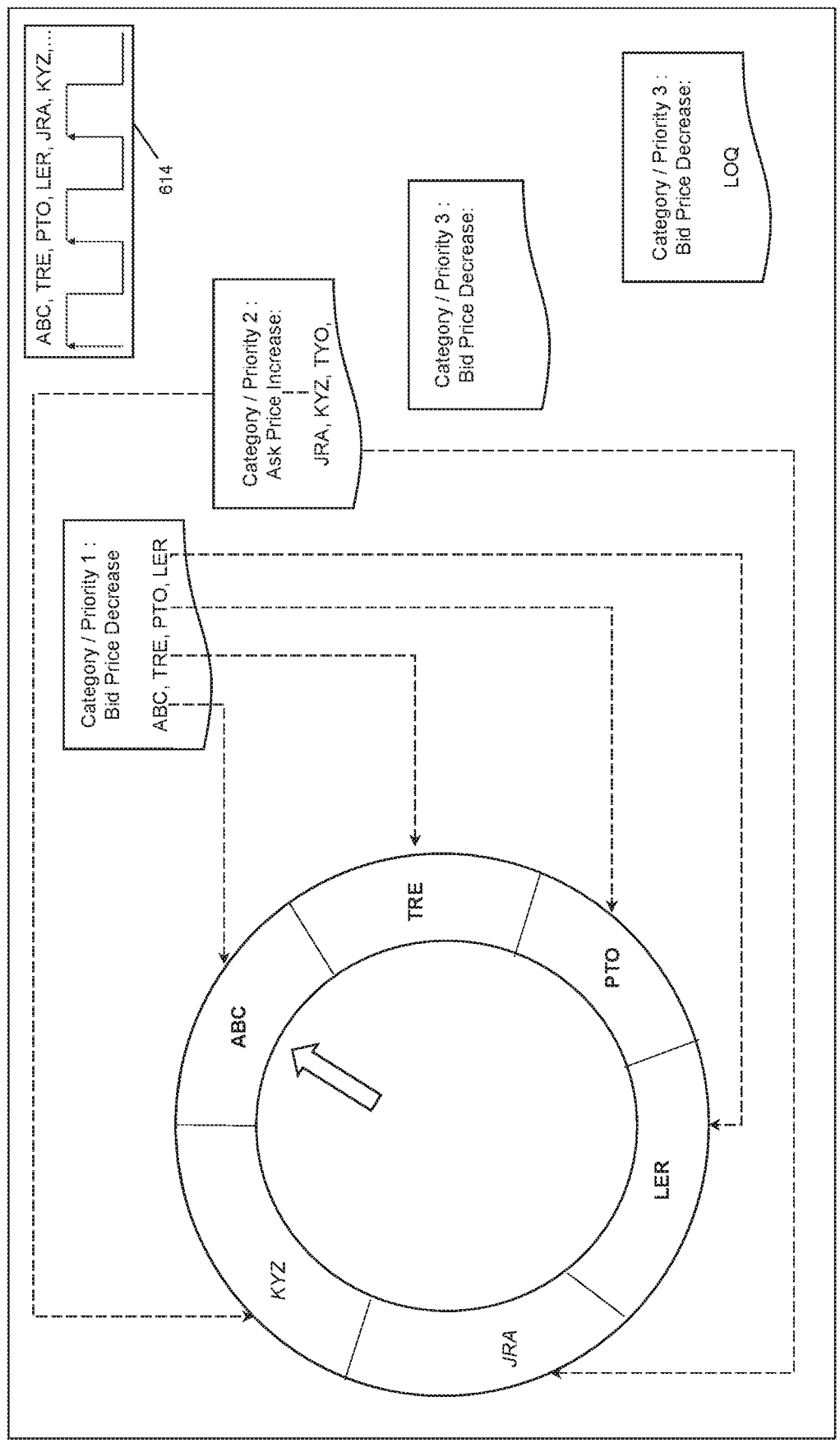
FIG. 4 is a schematic diagram showing categories for determining priority of trading data and showing a circular buffer for determining which security information is to be sent first on the bandwidth-constrained communication link, according to a possible embodiment.

Referring to FIG. 4, according to another possible implementation of the method, virtual "buckets" or "categories" can be created in the prioritization logics module, each category corresponding to a given type of variation. While FIG. 4 schematically represents a circular buffer (also referred to as buffer queues or ring buffers), other types of data structures can be used. In this example, category 1 corresponds to "bid price decrease", category 2 to "ask price increase, category 3 to "bid price decrease" and category 4 to "ask price decrease". After having compared the current state of a security with its previous state, by calculating variations of the different field values, the securities are assigned to/distributed in one or more of the categories (if applicable). The securities are then selected from those buckets/categories by the circular buffer (or other equivalent mechanism) when determining which security information or state is to be sent over the bandwidth-constrained communication link, for a given period.

Still referring to FIG. 4, the method may also include a step of continuously determining the remaining available bandwidth of the bandwidth-constrained communication link, in order to adjust the number of "current state" records sent thereover, based on the remaining available bandwidth determined. According to a possible embodiment, the prioritization logic module 612 (identified in FIG. 2) may comprise a budgeter or budgeting sub-module 614 to determine the remaining available bandwidth on the link, for a given clock period. For example, if for a given update/delta period, 4 securities have been subjected to "bid price decrease", and 3 securities have been subjected to "ask price increase", but there is only bandwidth left for sending the data/fields relating to 6 securities (correspond to a predetermined number of bits), the data/fields of all 4 securities labelled as "bid price decrease" will be sent over link 50, and data/fields of only 2 of the 3 securities labelled "ask price increase" will also be sent over link 50. The remaining securities labelled "ask price increase" will either be sent during the next clock period, sent on another communication link or replaced by other securities, if most current updates include variations of more importance.

In a possible implementation, the budgeter 614 successively scans the different categories and transmits the fields of records classified in the category of highest priority, followed by those having the second highest priority, and so on, until the bandwidth capacity of the first bandwidth-constrained communication link has been reached. Fields associated with security records having been assigned a higher priority are thus communicated over the communication link offering lower latency until up to bandwidth capacity, for a given period. When the bandwidth capacity of the first communication medium is reached, the records having the next highest priority can be communicated over an available second communication link offering higher latency than the first communication link but lower latency than the bandwidth-unconstrained link until the bandwidth capacity of the second communication link is reached, and so on. In any case, all of the trading data received can be transmitted over the unconstrained-bandwidth communication link, as is usual.

As trading data is received by the prioritization logic module, new bid and ask orders may become the new best book order and their price and volume fields are compared with the previous best book order. For example, the prioritization logic module 612 may identify in a security record and update for a new buy order for X security at the price of Y. It will then label the record as the new highest bid (best book order) and compare the volume (Y) and/or price (X) of this buy order update (bid) with the previous highest bid (or previous best book order). After said comparison, if the current state of the security indicates a bid price decrease, the record is labeled as a "bid price decrease" and classified in this category with other records subjected to bid price decrease.

As mentioned previously, the proposed method allows a remote device to receive in priority trading data associated with securities having the most significant variations. For example, a financial institution may want to avoid a series of events leading to a situation where a market making strategy relies on the bid or ask price of a security traded on an exchange in city A to set the right bid or ask price for an associated derivative security traded on an exchange in city B, and for which both prices are not aligned for an extended period of time. If the bid or ask price of the commodity traded in city A experiences a large variation, the financial institution will want to receive this information quickly in order to remove any order placed at the previous bid or ask price for the derivative security traded in city B. Hence, if such any order is canceled quickly enough, strategies of competitors may not be able to trade against the financial institution at an outdated price and incur losses to the financial institution. As can be appreciated, it is important for the financial institution to receive financial data related to bid price variations as early as possible and this type of financial data should be prioritized, when available, on a direct link, for example a limited bandwidth radio frequency channel or link.

Figure 5A:
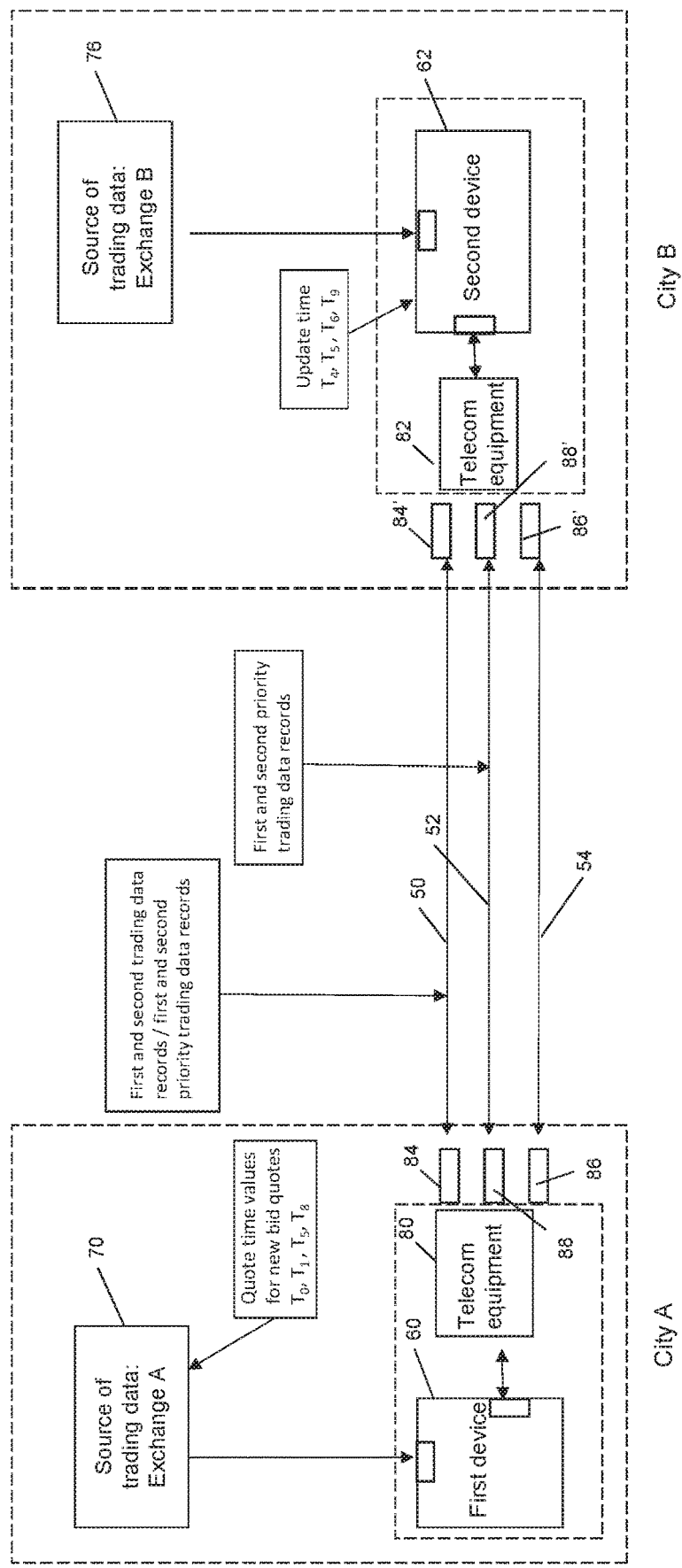
FIG. 5A is a schematic diagram of the system of FIG. 1, with trading events occurring at the different devices at times T0 to T9.

Referring now to FIG. 5A, the process will be explained from the "viewpoint" or frame of reference of the second device 62. As explained with reference to FIG. 1, trading data sent over the one or more communication links by the first processing device 60 is received by a telecommunication equipment 82. The telecom equipment(s) 82 can comprise routers, high speed switches, nodes and the like, and are connected to the one or more communication links 50, 52 and 54 via communication ports, identified by reference numbers 84', 86' and 88'. The telecommunication equipment 82 is connected, either directly or indirectly, to the second processing device 62 and communicates the trading data to the second processing device 62 as it is received.

Still referring to FIG. 5A, the second processing device 62 may be connected to another exchange 76, namely exchange B, and receives in priority trading data transmitted by the first processing device 60 over one or more bandwidth-constrained communication links 52 and 54. The second processing device 62 also receives a continuous stream of all the trading data over the unconstrained-bandwidth communication link 50, where the stream of all the trading data may also comprise the trading data transmitted in priority. For example, if the bid price for security ABC has dropped significantly, such that the record describing the new bid price is labeled as priority trading data by the prioritization logic module and transmitted over a bandwidth constrained communication link, the same record will also be transmitted over a bandwidth unconstrained communication link, regardless of its transmission over the bandwidth constrained communication link. In this example, the second processing device will receive the record with lower latency when transmitted over the bandwidth constrained communication link and it may be readily used for the execution of a task, for example the pricing of a financial instrument.

In order to use the records for the execution of a trading strategy, a book of orders, or a top of book, is maintained and needs to be recreated and updated at the second processing device 62 by using both the priority trading data transmitted over a bandwidth constrained communication link and the continuous steam of trading data transmitted over the unconstrained-bandwidth communication link. In implementations where the trading data received at the second processing device 62 is derived from L3 feeds, the second processing device continuously recreates or updates a book of orders. In other implementations, the trading data received at the second processing device may be derived from L1 feeds. In this case, the second device 62 needs nonetheless to recreate/update its top of book, since the L1-derived trading data is received at the second device with different latencies, from the different communication links.

The book of orders, or the top of book, may be recreated and updated at the second processing device 62 according to the quote time comprised in the fields of each trading data record transmitted over the bandwidth constrained or unconstrained communication link. Depending on the instructions stored in the prioritization logic module of the first processing device, the book of orders, or the top of book, may be updated more frequently with a specific type of trading data records having a more recent quote time value. For example, it could be decided that records related to a bid price variation of 5% or more for security ABC must be transmitted in priority to the second processing device over a bandwidth constrained communication link 52, 54. Therefore, the top of book recreated and updated at the second processing device 62 may be updated more frequently with more recent bid prices records representing a variation of 5% from the current bid price having a quote time closer to the current time. On the contrary, any trading data records representing a variation of the ask price or a variation of less than 5% of the bid price for security ABC, may be transmitted over the bandwidth unconstrained communication link 50. Therefore, the top of book recreated and updated at the second processing device may be updated with older trading data records representing a variation of the ask price or a variation of less than 5% of the bid price for security ABC and having a quote time farther from current time. When the top of book is updated with bid price variation records transmitted over the unconstrained bandwidth communication link, it may be explained by a lack of bid price variations of 5% or more since the last bid price update, or by the presence of trading data records having higher priority level assigned by the prioritization logic module, such that there is no available bandwidth on the bandwidth constrained communication link since the last bid price update.

Figure 5B:
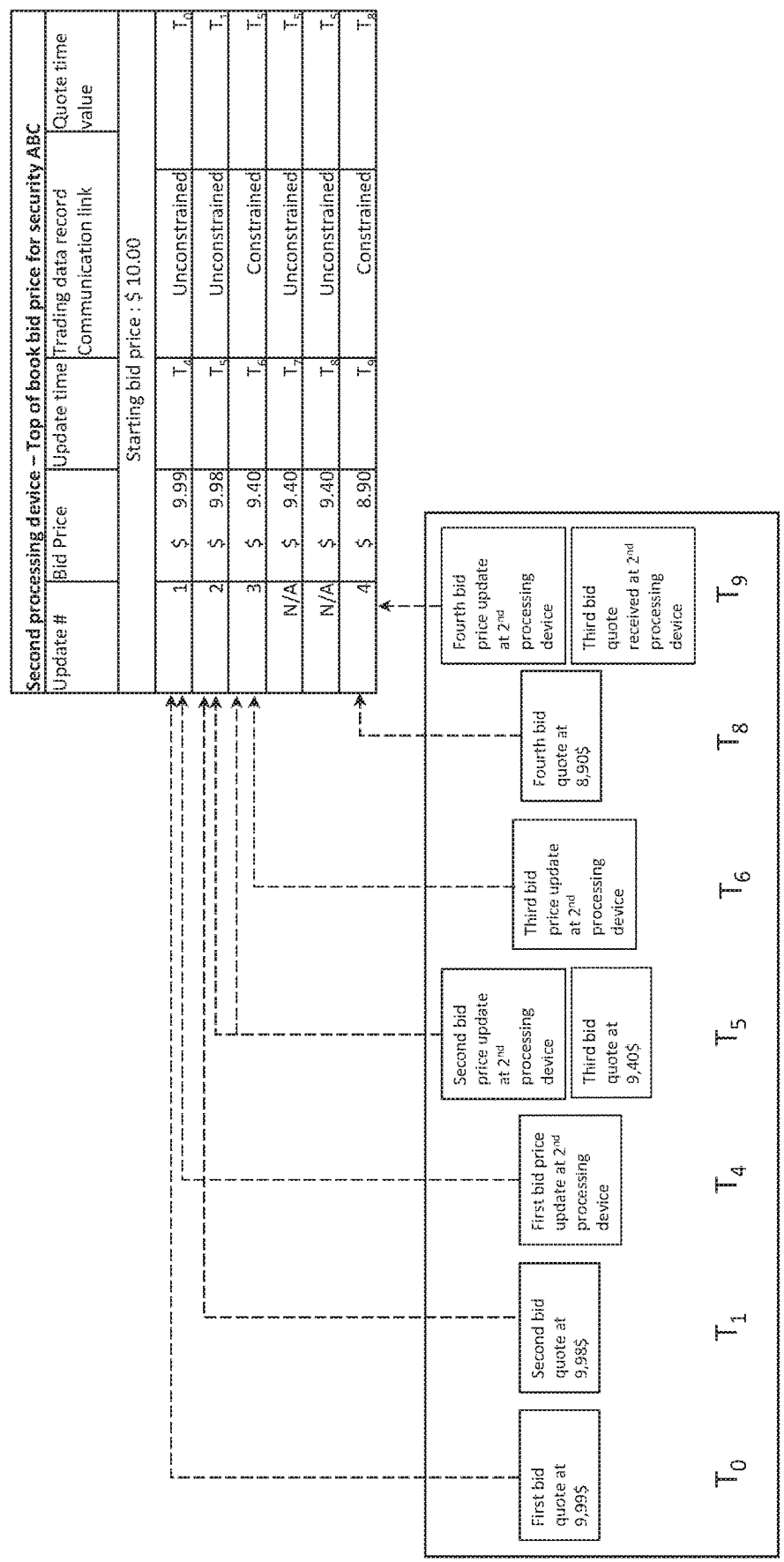
FIG. 5B is a schematic representation of a timeline of trading events, in the referential of the second device.

In a more precise example and referring to FIGS. 5A and 5B, bid price variation records are created and used to update the top of book at the second processing device 62 over a period of time extending from T0 to T9. At T4 and T5, the bid price may be updated twice at the second processing device, from 10.00$ to 9.99$ and then from 9.99$ to 9.98$, according to a first and second trading data records transmitted by the first processing device over the bandwidth unconstrained communication link, wherein the first and second trading data records respectively have a value of T0 and T1 as "quote time". At T6, the bid price may be updated for the third time, from 9.98$ to 9.40$, according to a first priority trading data record transmitted by the first processing device over the bandwidth constrained communication link, wherein the first priority trading data record has a value of T5 as "quote time". Between T6 and T9, the bid price may not be updated since bid price variation records transmitted over the bandwidth unconstrained communication link and received by the second processing device all have a quote time value older than T5. Then, at T9 the first priority trading data record having a value of T5 as "quote time" and previously transmitted over the bandwidth constrained communication link is received by the second processing device over the bandwidth unconstrained communication link. Also, at T9, a second priority trading data record having a value of T8 as "quote time" and a value of 8.90$ as "bid price" may be received by the second processing device over the bandwidth constrained communication link. In such a scenario, at T9, the second processing device may be programmed to update the top of book according to the second priority trading data record received by the second processing device since a "quote time" value of T8 is considered more recent than a "quote time" value of T5.

According to other possible embodiments, completed trades may be prioritized over state variations, since a completed trade may subsequently lead to a variation of the top of book for the security that has been traded. In such a scenario, records labeled or categorized as "completed trades" are transmitted by the prioritization logic module before other records subjected to price or volume variations. Financial institutions or trading entities may then have the ability to predict subsequent variations of the top of book before it actually happens.

Figure 6:
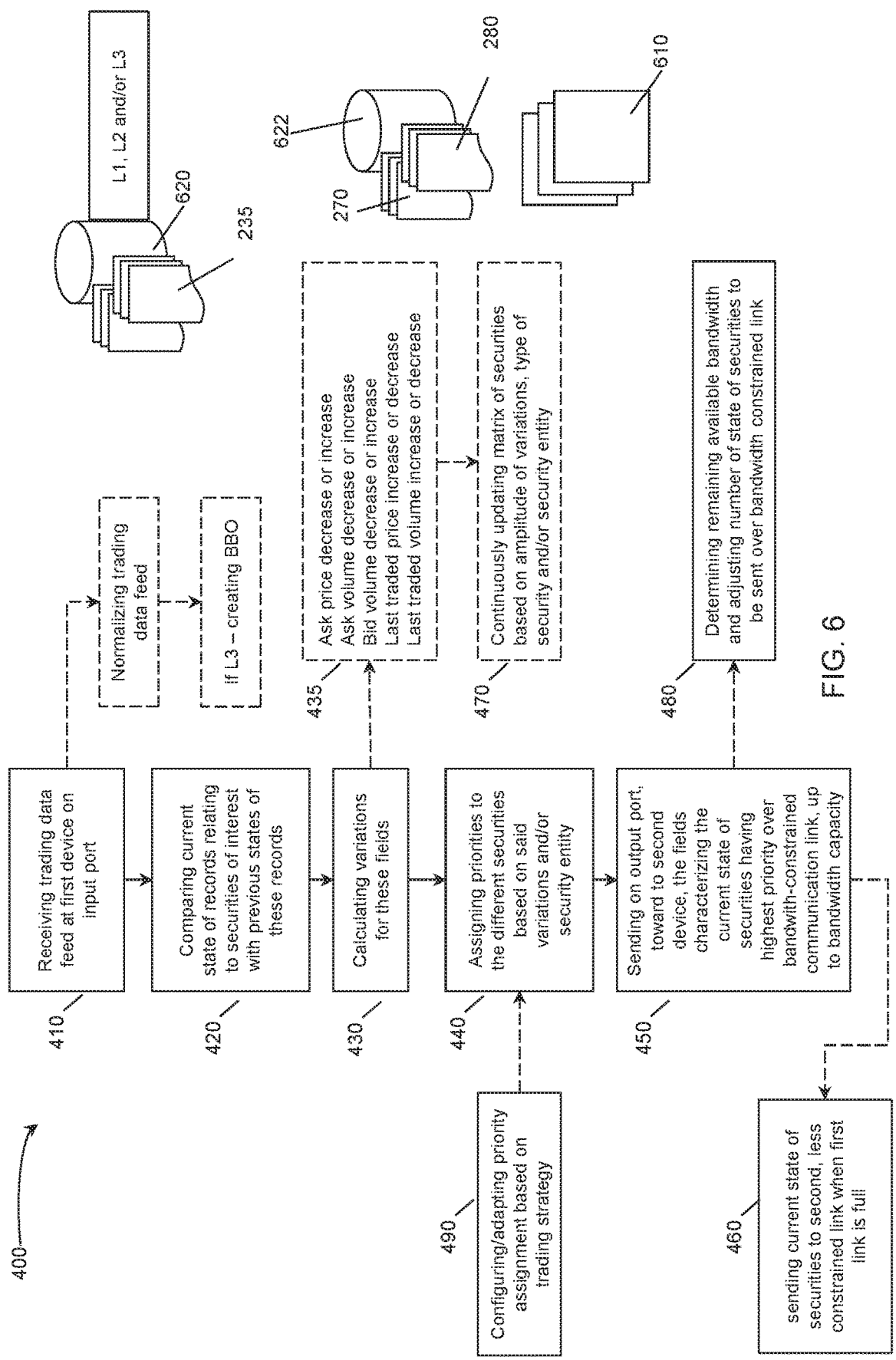
FIG. 6 is a flow chart describing steps of the method for prioritizing trading data over a bandwidth-constrained communication link, with an indication of the devices in which some of the steps occur, according to a possible embodiment.

With reference to FIG. 6, the different steps of the proposed method, including optional sub-steps are shown, as part of a flow chart diagram.

Of course, numerous modifications could be made to the embodiments described above without departing from the scope of the present disclosure.

The invention claimed is:

1. A computer-implemented method for prioritizing transmission of trading data from a first server to a second server, both servers being part of a computing system of a single trading entity, the trading data being sent over a first communication link or a second communication link between the first server and the second server, the first server being located in a first geographical location, the second server being remotely located in another geographical location, comprising:
receiving at least one trading data feed at the first server, from one or more trading data sources, each trading data feed comprising a plurality of records associated with securities being traded and comprising fields that are indicative of a current state of a given security, said fields comprising at least a price field and a volume field;
accessing, by the first server, transmission rules setting priorities for securities-of-interest for the single trading entity, the priorities being set at least based on price or volume variations;
calculating, by a prioritization module of the first server, price variations and volume variations of the securities-of-interest by comparing values in price and volume fields of current state records received with corresponding values in corresponding price and volume fields of one or more previously received records;
assigning, by the prioritization module of the first server, the priorities to the current state records received, based on the price variations and the volume variations calculated and based on the transmission rules accessed;
continuously calculating, by a budgeter module of the first server, a remaining available bandwidth of the first communication link, the first communication link being a direct bandwidth-constrained radio-frequency communication link;
adjusting, by the budgeter module of the first server, a number of current state records to be sent over the first communication link in a given clock period, based on the remaining available bandwidth;
sending, by the first server, for the given clock period, the current state records having highest priorities over the first communication link, up to bandwidth capacity, to said second server; and
sending remaining current state records on the second communication link, the second communication link being a less constrained fiber optic communication link,
thereby allowing the second server to receive, in priority, the trading data associated with a set of securities having greatest variations via the direct bandwidth-constrained radio-frequency communication link while subsequently receiving the trading data associated with the securities-of-interest via the less constrained fiber optic communication link.

2. The computer-implemented method according to claim 1, wherein the at least one trading data feed comprises L1 (Level 1) or top of book trading data feed and/or L2 (Level 2) trading data feed.

3. The computer-implemented method according to claim 1, wherein the at least one trading data feed received at the first server comprises one or more full depth (L3) trading data feeds, further comprising a step of creating a book of orders from the one or more full depth (L3) trading data feeds received.

4. The computer-implemented method according to claim 1, wherein the fields comprise: top-of-book bid price, top-of-book ask price, top-of-book bid volume and top-of-book ask volume.

5. The computer-implemented method according to claim 4, wherein the fields further comprise one or more of: last traded price and last traded volume; ticker/security symbol, quote time, exchange identity, an indication of a completed trade, notifications of corrections and/or admin messages.

6. The computer-implemented method according to claim 5, wherein calculating variations comprises at least one of: calculating a bid price decrease or increase; calculating an ask price decrease or increase; calculating a bid volume decrease or increase; calculating an ask volume decrease or increase; calculating a last traded price decrease or increase; calculating a last traded volume decrease or increase; and calculating a daily turnover volume increase or decrease.

7. The computer-implemented method according to claim 5, comprising a step of identifying, from the at least one trading data feed, records relating to the securities-of-interest by verifying an identifier field of a given record and matching it to an identifier of a predetermined list of identifiers.

8. The computer-implemented method according to claim 7, wherein the step of assigning the priorities to the securities-of-interest is also based on a list in which the securities-of-interest are ordered from a first security having a most level-of-interest to a last security having a least level-of-interest.

9. The computer-implemented method according to claim 1, wherein assigning the priorities to the securities-of-interest is performed using a 2-dimensional matrix, said 2-dimensional matrix comprising a first dimension corresponding to an amplitude of the price or volume variations and a second dimension corresponding to a type of the price or volume variations, the type of the price or volume variations including a price variation or a volume variation.

10. The computer-implemented method according to claim 1, wherein assigning the priorities to the securities-of-interest is performed using a 3-dimensional matrix, said 3-dimensional matrix comprising a first dimension corresponding to an amplitude of the price or volume variations; a second dimension corresponding to a type of the price or volume variations, the type of the price or volume variations including a price variation or a volume variation; and a third dimension corresponding to a level of interest of the securities.

11. The computer-implemented method according to claim 1, wherein assigning the priorities to the securities-of-interest is performed using a plurality of different matrices.

12. The computer-implemented method according to claim 1, wherein the transmission rules are set to assign a higher priority to the securities-of-interest having the price variations over the securities-of-interest having the volume variations.

13. The computer-implemented method according to claim 1, wherein the transmission rules for attributing the priorities to the securities-of-interest are configurable and/or adaptable.

14. The computer-implemented method according to claim 1, wherein the direct bandwidth-constrained radio-frequency communication link is a first bandwidth-constrained communication link and a second bandwidth-constrained communication link is provided between the first server and the second server, the second bandwidth-constrained communication link being less constrained that the first bandwidth-constrained communication link, further comprising sending current state fields relating to the securities-of-interest having been assigned the highest priorities to the second bandwidth-constrained communication link, when the first bandwidth-constrained communication link is full.

15. A computing system of a trading entity for prioritizing transmission of trading data, comprising:
- a first server and a second server, the first server being located in a first city close to geographical location and being in communication with an exchange server, either directly or via an aggregator, the second server being remotely located in a distinct geographical location;
- a first communication link and a second communication link between the first server and the second server, the first communication link being a direct bandwidth-constrained radio-frequency communication link, the second communication link being a less constrained fiber optic communication link;
- the first server comprising:
  - i. an input port for receiving at least one trading data feed from one or more trading data sources, each trading data feed comprising a plurality of records, associated with securities being traded and comprising fields indicative of a current state of the securities, said fields comprising at least a price field and a volume field;
  - ii. one or more processors;
  - iii. a storage medium for storing the fields indicative of the current state and a previous state of the securities; for storing transmission rules, the transmission rules setting priorities for securities-of-interest for the trading entity, the transmission rules being set at least based on price or volume variations; and for storing a prioritization logic module and budgeter module comprising processor-executable instructions for:
    - calculating price variations and volume variations of current state records received at the first server by comparing current values in price and volume fields thereof with previous values in corresponding price and volume fields of one or more previously received records for said securities;
    - assigning the priorities to the current state records received based on the price variations and the volume variations calculated and based on the transmission rules accessed;
    - continuously calculating a remaining available bandwidth of the first communication link; and
    - adjusting a number of current state records to be sent over the first communication link in a given clock period, based on the remaining available bandwidth,
  - iv. a first output port for sending, for the given clock period, the current state records having highest priorities over the first communication link, up to bandwidth capacity, to said second server, and
  - v. a second output port for sending remaining current state records on the second communication link, and
- the second server receiving, in priority, a first portion of the trading data associated with the securities-of-interest having greatest variations via the direct bandwidth-constrained radio-frequency communication link while eventually subsequently receiving a second portion of the trading data associated with the securities-of-interest via the less constrained fiber optic communication link.

16. The computing system according to claim 15, wherein the storage medium comprises 2-dimensional matrix which is continuously updated, said 2-dimensional matrix comprising a first dimension corresponding to an amplitude of the price or volume variations and a second dimension corresponding to a type of the price or volume variations, the type of the price or volume variations including a price variation or a volume variation, the transmission rules being set for assigning higher priorities to the securities-of-interest having the price variations with the amplitude above a given threshold.

17. The computing system according to claim 15, wherein the prioritization logic module comprises instructions for calculating variations, said variations comprising at least one of: a bid price decrease or increase; an ask price decrease or increase; a bid volume decrease or increase; an ask volume decrease or increase; a last traded price decrease or increase; and a last traded volume decrease or increase.

18. The computing system according to claim 15, wherein the prioritization logic module further comprises instructions for assigning the priorities to the securities-of-interest based on a list wherein the securities-of-interest are ordered from a first security having a most level-of-interest to a last security having a least level-of-interest.

* * * * *